Aug. 16, 1955 SAKUTA SUZUKI ET AL 2,715,354
PHOTOGRAPHIC OBJECTIVE WITH WIDE RELATIVE APERTURE
Filed Jan. 28, 1954
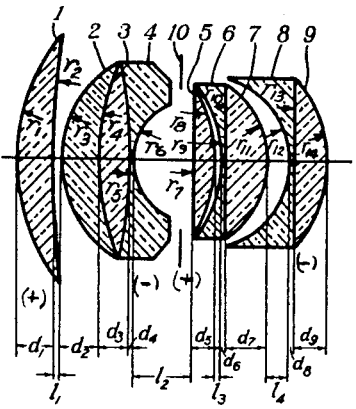
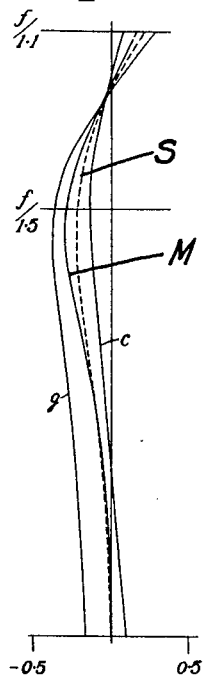
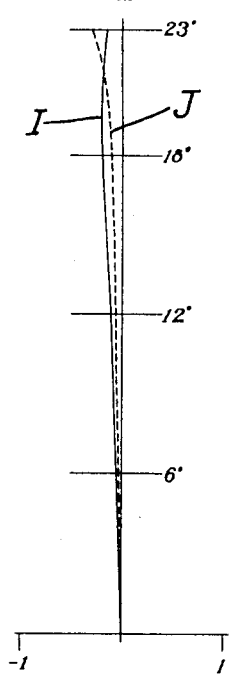
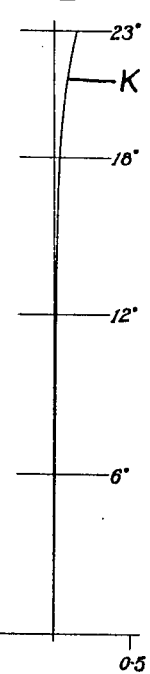
Inventors
SAKUTA SUZUKI
MICHISABURO HAMANO
By
Attorney

United States Patent Office

2,715,354
Patented Aug. 16, 1955

---

2,715,354

PHOTOGRAPHIC OBJECTIVE WITH WIDE RELATIVE APERTURE

Sakuta Suzuki, Chuoku, Tokyo, and Michisaburo Hamano, Shibuyaku, Tokyo, Japan

Application January 28, 1954, Serial No. 406,624

Claims priority, application Japan May 9, 1953

1 Claim. (Cl. 88—57)

This invention relates to improvements in a photographic objective with a wide relative aperture.

There has been heretofore proposed many types of photographic objectives with wide relative apertures. It, however, is well known that the present objective has the aperture of F/1.4 as its upper limit. With the recent advances of scientific researches and cinematography, and the popularity of photo-news and color photography, the objectives with wide apertures have been more in demand. In the ultra rapid objective with the aperture exceeding F/1.4 according to prior art, individual single lenses constituting the lens system thereof should have much thinner marginal or middle portions relative to the radii of curvature of the lens surfaces due to the focal lengths, provided that special optical glasses are not used. However such lenses are not suitable for mass production. More particularly, it is very difficult to focus an image in a plane surface of a frame 36 x 24 mm. taken on standard 35 mm. cine film. It necessarily follows that there is no means other than that for focusing in a curved surface of that frame.

Accordingly, it is an object of the present invention to provide an improved photographic objective with a wide relative aperture exceeding F/1.4 made of the optical glasses utilized customarily heretofore.

It is a further object of the invention to provide an improved photographic objective suited for use with a camera which takes 36 x 24 mm. pictures.

In accordance with the present invention, a photographic objective lens system comprises five axially aligned and air spaced components formed of nine lens elements; the first component comprising a converging convex meniscus lens element positioned with its convex surface towards the object space; the second component comprising a dispersive combination of a converging convex meniscus, a bi-convex lens element and a bi-concave lens joined by cemented surfaces in the order named; the third component comprising a planoconvex lens element positioned with its plane surface towards the object space; the fourth component comprising a plano-concave lens element with its plane surface cemented to the plane surface of a further planoconvex lens element and positioned with its concave outer surface towards the object; and the fifth component comprising a dispersive combination formed of a further plano-concave lens element with the plane surface portion cemented to the plane surface of an additional planoconvex lens element and with the outer concave surface towards the object; and whereby the outer concave air surfaces of each component are concave towards the diaphragm positioned between the second and third components of the objective.

This type of lens construction makes possible objectives having wide apertures ranging from F/1.3 up to F/0.8 employing the conventional optical glasses.

For a more complete understanding of the invention and for illustration of it, reference is made to the accompanying drawings in which:

Fig. 1 schematically illustrates a longitudinal section of a photographic objective embodying the present invention;

Fig. 2 shows graphs illustrating the spherical and chromatic aberration and sine condition of the objective shown in Fig. 1;

Fig. 3 shows graphs illustrating the astigmatic aberration of the same; and

Fig. 4 shows a graph illustrating the distortion of image formed by the objective shown in Fig. 1.

Referring to Fig. 1, a photographic objective shown is one embodiment of the present invention and has a relative aperture of F/1.1 and focal length of 50 mm. In Fig. 1, a convex (positive) meniscus lens 1 with a convex spherical surface thereof toward a subject comprises the first lens section of the objective and converges the rays of light which progress from the left side of the drawing to the objective. This lens 1 is made of the extra dense barium flint glass ($nd=1.6700$ and $vd=47.2$, where $nd$ is the index of refraction for the monochromatic light of the Fraunhofer line $d$ and $vd$ the Abbe's value) under consideration of the focal length, chromatic aberration and distortion. The radius of the first spherical surface $r_1$ of the lens 1, i. e. the surface facing the subject depends upon the maximum incident angle of the incident rays which are available by the objective. The radius of the back spherical surface $r_2$ and thickness $d_1$ of the lens 1 are determined to give the desired focal length and to make the distortion minimum. The thickness of the lens denotes the distance between its vertices, that is, the distance between the points of intersection of its respective surfaces with the principal or optical axis, and individual spherical surface has the respective center on the principal axis. The radii $r_1$ and $r_2$ are taken positive if the surface is convex toward the subject and negative if it is concave toward the subject.

The second lens section is arranged to space a very small air gap $l_1$ apart from the first section. The air gap denotes the distance between the points of the back surface of the lens and that of the front surface of the succeeding lens with the principal axis respectively. The second section is of dispersive or divergent character and comprises a triple lens cementing a further convex meniscus 2, a bi-convex 3 and a bi-concave lens 4 together in that order by a suitable binder such as Canada balsam. The triple lens serves to diverge and focus the convergent image formed by the first section.

The length of the air gap $l_1$ is determined to correct for the distortion. The first lens 2 of the second section made of the extra dense barium flint glass ($nd=1.6700$, $vd=47.2$) converges the pencils of light from the lens 1. The radius of the front spherical surface $+r_3$ and thickness $d_2$ of the lens 2 are determined to converge the rays from the lens 1 to correct for the spherical aberration and to satisfy the sine condition. Since the back spherical surface of the lens 2 is the junction surface with the front spherical surface of the lens 3, the radii of both surfaces should evidently be equal. This radius $+r_4$ and the thickness $d_3$ of the lens 3 are made to give the focal length required for divergent focusing of the bi-concave lens 4 (which is the third lens of the second section) combined with the convex meniscus lens 2. Due to the divergent focusing effect of the lens 4, the lens 3 has ordinarily been made of a low refractive material such as the fluorine-crown glass having the indices of refraction ranging from 1.463 to 1.487 in accordance with prior design. In this invention, the lens 3, however, is preferably made of the borosilicate crown glass ($nd=1.5163$, $vd=64.0$) to give the focal length required for divergent focusing of the lens 4.

Since the back spherical surface of the bi-convex lens 3 is the junction surface with the front spherical surface of the bi-concave lens 4, the radii of both surfaces must be equal. Also, the thickness $d_3$ and radii of the front and back spherical surfaces $-r_4$, $-r_5$ of the lens 3 are determined under consideration of the spherical and chromatic aberration. The material of the lens 4 is the extra dense flint glass ($nd=1.7400$, $vd=28.2$). The radius of the back concave spherical surface $+r_6$ of the lens 4 is one of the most impotrant matters in the objective of the wide aperture. The radii $-r_5$, $+r_6$ and thickness $d_4$ of the lens 4 are determined to correct for the spherical, astigmatic and chromatic aberration, distortion and curvature and to satisfy the sine condition. Furthermore, the radii $-r_5$, $+r_6$ and thickness $d_4$ should be made to give the required back focal length.

The first lens system which consists of the first and second sections combined together is required to have various aberration corrected to a certain extent. This system also should have the back focal length accommodated to the focal length of the second lens system disposed behind the first section. This back focal length is preferably as short as possible. By way of example, such a photographic objective has the aperture of F/2.8 and focal length of 131.17 mm.

The second lens system is considered characteristic of the invention and comprises the third, fourth and fifth sections. That is, it consists of five single lenses separated by air medium into three sections. This system is disposed between the final back surface and back focus of the first system and the distance between the first and second system is $l_2$. The rays passed through the first system are converged by the third and also fourth sections and then diverged by the fifth section to form the desired final image which is substantially completely corrected for all aberrations.

As described above, the first lens system is corrected for a certain extent of different aberrations. In this case, the image formed by the first system is in the image field having small negative aberrations. In order that the image formed by the first system may not be deformed, the second lens system disposed at the distance $l_2$ from the first system is required to have positive aberrations of such magnitudes that these negative aberrations may be just compensated. Therefore, the front surface of the third section, i. e. the surface of the lens 5 opposed to the first system is made to have its radius of curvature $r_7$ equal to infinity. In other words, this surface should be plane to correct for the spherical and chromatic aberration and also distortion of the final image. It has been found that the desired final image is not satisfactory, provided that this surface would have positive or negative finite radius of curvature. The lens 5 is made in form of a plano-convex lens for converging the rays passed through the first system and its material is the extra dense barium flint glass ($nd=1.6700$, $vd=47.2$). Its thickness $d_5$ and radius of the back spherical surface $-r_8$ are determined under consideration of the spherical aberration and distortion. The lens 5 has preferably a long focal length because it serves to converge the rays in the manner described above.

There is provided an air gap $l_3$ between the third and fourth sections. The fourth section is of dioptric or convergent character and comprises a plano-concave 6 and a further plano-convex lens 7 with their plane portions cemented together by a suitable binder such as Canada balsam. The fourth section as well as the fifth section behind it are made of the proper optical glasses to correct for the chromatic and spherical aberration.

The length of the air gap $l_3$ is determined to correct for the spherical and astigmatic aberration and distortion. The radius of the front spherical surface $-r_9$ of the lens 6 acts to correct for the distortion and to prevent flare. The light flint glass ($nd=1.5814$, $vd=40.8$) is employed as the material of the lens 6. The radius of the back spherical surface $-r_{11}$ of the plano-convex lens 7 is determined to correct for the chromatic and spherical aberration and to prevent flare and furthermore to give the desired back focal length of the second lens system. The lens 7 is made of the extra dense barium crown glass ($nd=1.6584$, $vd=50.8$). Also, the thicknesses of the lenses 6 and 7, $d_6$ and $d_7$, are determined under consideration of the spherical aberration.

The fifth section which is the final one of the second lens system is disposed at the distance $l_4$ from the fourth section. This section is of dispersive character and comprises an achromatic lens consisting of a further plano-concave lens 8 and an additional plano-convex lens 9 with their plane portions cemented together by a suitable binder such as Canada balsam. The length of the air gap $l_4$ principally serves to correct for the coma. The fifth section functions to diverge the rays passed through the fourth section and to give the desired aperture and resulting focal length, whereby the superior image field may be obtained. The lens 8 is made of the light barium flint glass LBF4 ($nd=1.5796$, $vd=53.9$), while the lens 9 is made of the extra dense barium crown glass EDC5 ($nd=1.6584$, $vd=50.8$). The radius of the front spherical surface $-r_{12}$ of the lens 8 is determined to correct for the distortion and spherical aberration. The radius of the back spherical surface $-r_{14}$ of the lens 9, also is determined to correct for the distortion, curvature and spherical aberration. The spherical aberration is corrected by the thicknesses of the lenses 8 and 9, $d_8$ and $d_9$.

It is noticed that the radius of the back surface $-r_8$ of the lens 5 is made to be equal to the radius of the back surface $-r_{14}$ of the lens 9 by properly selecting the materials of lenses 5, 6, 7, 8 and 9.

The iris type of diaphragm 10 is disposed at the proper position between the second and third sections.

The data of various elements consisting of the photographic objective designed according to teachings of the invention will now be shown in the following table by way of example. The objective thus obtained has the focal length of 50 mm. and the aperture of F/1.1. It may cover a 36 x 24 mm. picture.

| | | | |
|---|---|---|---|
| $r_1= +35.8$ mm. | $d_1= 8.35$ mm. | $r_8=-23.0$ mm. | $l_3=0.71$ mm. |
| $r_2=+240.0$ mm. | $l_1= 0.1$ mm. | $r_9=-20.0$ mm. | $d_6=0.78$ mm. |
| $r_3= +21.0$ mm. | $d_2= 7.33$ mm. | $r_{10}=\infty$ | $d_7=8.52$ mm. |
| $r_4= +51.0$ mm. | $d_3= 4.5$ mm. | $r_{11}=-16.7$ mm. | $l_4=0.67$ mm. |
| $r_5= -330.0$ mm. | $d_4= 1.45$ mm. | $r_{12}=-16.3$ mm. | $d_8=1.2$ mm. |
| $r_6= +11.5$ mm. | $l_2=11.46$ mm. | $r_{13}=\infty$ | $d_9=6.5$ mm. |
| $r_7=\infty$ | $d_5= 5.42$ mm. | $r_{14}=-23.0$ mm. | |

| No. of Lens. | Material of Optical Glass | | | |
|---|---|---|---|---|
| | Name of General Classification | Abbreviation | Index of Refraction | Abbe's Value |
| 1 | Extra dense barium flint. | EDBF 670472 | 1.6700 | 47.2 |
| 2 | ----do---- | EDBF 670472 | 1.6700 | 47.2 |
| 3 | Borosilicate-crown | BSC 516640 | 1.5163 | 64.0 |
| 4 | Extra dense flint | EDF 740282 | 1.7400 | 28.2 |
| 5 | Extra dense barium flint. | EDBF 670472 | 1.6700 | 47.2 |
| 6 | Light flint | LF 581408 | 1.5814 | 40.8 |
| 7 | Extra dense barium crown. | EDBC 658508 | 1.6584 | 50.8 |
| 8 | Light barium flint | LBF 580539 | 1.5796 | 53.9 |
| 9 | Extra dense barium crown. | EDBC 658508 | 1.6584 | 50.8 |

In the previous cemented lens, the junction surface customarily is spherical, but the invention utilizes the plane junction surface as seen in the fourth and fifth sections. This utilization of the plane surface makes it possible to eliminate all aberrations and to obtain the wide picture angle.

It is noticed that the second lens system comprising the third, fourth and fifth sections, is arranged so that all of the spherical surfaces of three sections are concave toward the first lens system. If three sections would be arranged so that all of these spherical surfaces are convex toward the first system, the image principal plane of the second system would be displaced toward the positive direction, that is, the direction approaching the subject. As a result, the distance between the final back surface and back focus of this lens system is shorter, resulting in that the desired effective picture angle cannot be obtained in the focal plane. This results from the fact that due to the image field and image ring, the wider the aperture is, the more the length of the glass portions through which the rays pass increases, and the back focus becomes more adjacent to said back surface. The image principal plane therefore should be disposed as far rearward as possible, in order to obtain the wider picture angle. It has been determined experimentally that when the prior type of design is employed, the lens immediately preceding one for diverging the pencils of light converged by the second section of this system, i. e. the lenses 6 and 7, has a small enough radius to attain its lower limit, and therefore the radius is too small to obtain the desired picture angle. The arrangement of the invention overcomes this difficulty. According to this arrangement, the image principal plane can be shifted as far rearward as possible, and the back focus also can be disposed far from the final back surface.

Fig. 4 shows a graph illustrating the distortion of image. The ordinate denotes the incident angle and the abscissa denotes the difference between the size of the actual image and that of the ideal one. It is seen from curve K that the distortion of the objective of the invention is very small and may stand comparison with that of the existing one.

The numerical values of various elements and the materials of the optical glass of the objective referred to have been described only as an example. It will be apparent that this invention is by no means limited to these values and use of the materials. It will be understood that the radii and thicknesses of various lenses constituting the objective and the distances between the lenses may be changed within certain ranges, depending upon the materials of the optical glass employed and the focal length of the complete objective etc. Now the ranges within which various elements of the second lens system relating to the invention may be changed, will be shown in terms of percentage with respect to the focal length of the complete objective.

| $r_7 = \infty$<br>$-r_8 = 42$ to $54\%$<br>$-r_9 = 36$ to $48\%$<br>$r_{10} = \infty$ | $d_6 = 11.4$ to $8\%$<br>$d_7 = 1.8$ to $0.8\%$<br>$d_8 = 3.6$ to $1.5\%$<br>$d_9 = 18$ to $14\%$ | $-r_{11} = 30$ to $40\%$<br>$-r_{12} = 30$ to $36\%$<br>$r_{13} = \infty$<br>$-r_{14} = 42$ to $54\%$ | $l_4 = 1.4$ to $0.6\%$<br>$d_3 = 3.2$ to $1.4\%$<br>$d_9 = 14$ to $9\%$ |
| --- | --- | --- | --- |

The objective formed of the second lens system of the invention (which has the focal length of 31.544 mm.) with the first lens system of focal length of 131.17 mm. referred to at the distance of 11.46 mm. had the focal length of 51.813 mm. and the distance from the back surface of the objective to its back focus was 15.95 mm.

In the objective according to prior art, the second lens system comprises a compound lens cementing three or four single lenses together so that the objective with the aperture exceeding F/1.4 has the very thick middle portion, resulting in the difficulty of obtaining the desired picture angle in the image field. The second system of the invention overcomes this difficulty.

Various curves shown in Figs. 2, 3 and 4 illustrate the superiority of the objective according to the invention.

Fig. 2 shows graphs illustrating the spherical and chromatic aberration and also sine condition of the objective shown in the above table. The ordinate denotes the distance of the light ray incident upon the objective from its optical axis, i. e. the incident height, and the abscissa denotes the deviations of the formed image from the ideal image plane. The solid line $m$ is the curve of the spherical aberration for the monochromatic light of the Fraunhofer line $d$ and the dotted line $s$ is the curve of the sine condition for the same line. The solid lines with the reference character $c$ and $g$ illustrate the positions of the images for the monochromatic light of the Fraunhofer lines $c$ and $g$ respectively. It is seen from these curves that the objective referred to better satisfies the sine condition than the existing objective of relatively narrow aperture and that the spherical and chromatic aberration is corrected to the same order compared with the last-mentioned objective.

Fig. 3 shows graphs illustrating the astigmatic aberration of the objective referred to. The ordinate denotes the angle of the light ray incident upon the objective with respect to its optical axis, i. e. the incident angle and the abcissa has the same meaning as in Fig. 2. The solid line I illustrates the positions of the sagittal images and the dotted line J, the positions of the meridional images. Both lines are referred to the monochromatic light of the Fraunhofer line $d$. These curves illustrate that the correction for astigmatic aberration is very excellent.

It is appreciated from the curves of Fig. 3 that the curvature of image is minute. This may be proved by means of the numerical calculation. That is, the objective referred to sufficiently satisfies the Petzval's condition.

From the foregoing description, it is evident that the second lens system comprising the third, fourth and fifth sections can correct for various aberrations and form the definite image with the desired picture angle. It is possible to make the photographic objective with the apertures ranging from F/1.3 to F/0.8 by employing the conventional optical glasses. Furthermore, there are provided the objective of the focal lengths ranging from 12 mm. to 100 mm. in the same type.

What we claim is:

A photographic objective comprising a lens system corrected for different aberrations, and a further lens system disposed between the back surface and back focus of the lens system and spaced apart from said back surface, characterized in that said further lens system comprises five lens elements separated by an air medium into three sections, the first section comprising a plano-convex lens element with a plane portion thereof opposed to said lens system, the second section comprising a dioptric combination comprising a plano-concave lens element with a plane portion thereof united with a plane portion of a further plano-convex lens element, the third section comprising a dispersive combination comprising a further plano-concave lens element with a plane portion thereof united with a plane portion of an additional plano-convex lens element, and said first, second and third sections being arranged so that all of the spherical surfaces of three sections in contact with the air medium exclusive of the plane portion of the first section are concave toward said lens system, whereby the position of the back focus of said further lens system is disposed as far rearward as possible wherein the radii of the convex spherical surface of said plano-convex element range from 42 to 50% of the focal length of said objective and thicknesses thereof from 11.4 to 8% of the focal length; the radii of the concave spherical surface of said plano-concave element from 36 to 48% of the focal length and thicknesses thereof from 3.6 to 1.5% of the focal length; the radii of the convex spherical surface of said further plano-convex element from 30 to 40% of the focal length and thicknesses thereof from 18 to 14% of the focal length; the radii of the concave spherical surface of said further plano-concave element from 30 to 36% of the focal length and thicknesses thereof from 3.2 to 1.4% of the focal length; and the radii of the convex spherical surface of said additional plano-convex element from 42 to 54% of the focal length and thicknesses thereof from 14 to 9% of the focal length, and wherein the distances between said first and second sections range from 1.8 to 0.8% of the focal length, and the distances between said second and third sections range from 1.4 to 0.6% of the focal length.

References Cited in the file of this patent

UNITED STATES PATENTS

| | | |
|---|---|---|
| 1,584,272 | Bertele | May 11, 1926 |
| 1,779,257 | Lee | Oct. 21, 1930 |
| 1,812,717 | Rudolph | June 30, 1931 |
| 2,084,309 | Bertele | June 22, 1937 |
| 2,106,077 | Tronnier | Jan. 18, 1938 |
| 2,171,641 | Berek | Sept. 5, 1939 |

FOREIGN PATENTS

| | | |
|---|---|---|
| 630,224 | Germany | May 23, 1936 |
| 497,550 | Great Britain | Dec. 21, 1938 |